(12) United States Patent
Brinkmann et al.

(10) Patent No.: US 11,069,159 B1
(45) Date of Patent: *Jul. 20, 2021

(54) DRIVING TRIP AND PATTERN ANALYSIS

(71) Applicant: Arity International Limited, Belfast (IE)

(72) Inventors: Margaret A. Brinkmann, Palo Alto, CA (US); Daniel Kraft, Libertyville, IL (US); Nathan M. Bryer, Arlington Heights, IL (US); Eric D. Huls, Chicago, IL (US); Thomas Michael Warden, Belmont, CA (US)

(73) Assignee: Arity International Limited, Belfast (IE)

( * ) Notice: Subject to any disclaimer, the term of this patent is extended or adjusted under 35 U.S.C. 154(b) by 30 days.

This patent is subject to a terminal disclaimer.

(21) Appl. No.: 16/722,113

(22) Filed: Dec. 20, 2019

Related U.S. Application Data

(63) Continuation of application No. 16/193,133, filed on Nov. 16, 2018, now Pat. No. 10,553,042, which is a
(Continued)

(51) Int. Cl.
*G07C 5/02* (2006.01)
*G06Q 40/08* (2012.01)
(Continued)

(52) U.S. Cl.
CPC ............... *G07C 5/02* (2013.01); *G01S 19/01* (2013.01); *G06Q 40/08* (2013.01); *G07C 5/008* (2013.01)

(58) Field of Classification Search
CPC .......... G07C 5/02; G07C 5/008; G06Q 40/08; G01S 19/01
See application file for complete search history.

(56) References Cited

U.S. PATENT DOCUMENTS 5,131,848 A 7/1992 Adams
5,797,134 A 8/1998 McMillan et al.
(Continued)

FOREIGN PATENT DOCUMENTS

WO 2001018531 A1 3/2001
WO 2011057217 A2 5/2011
WO 2011128873 A2 10/2011

OTHER PUBLICATIONS

Rob Schneider,"Insurance Underwriting and Credit Scores", Consumer Union, Jan. 2003.
(Continued)

*Primary Examiner* — Nadeem Odeh
(74) *Attorney, Agent, or Firm* — Banner & Witcoff, Ltd.

(57) ABSTRACT

A driving analysis server may be configured to receive vehicle location data and/or operation data from one or more vehicle systems, identify driving trips and/or driving patterns based on the vehicle data, determine risk assessment values corresponding to the driving trips and driving patterns, and calculate driver scores based on the analyzed driving trip and driving pattern data. Destination locations may be identified for a vehicle's driving trips, and information relating to the destination locations may be retrieved and analyzed to determine risk factors and risk assessment values associated with driving to and from the destination, as well as parking at the destination. Specific driving trip types or purposes may be identified, and driving scores may be calculated based on the vehicle location and time data, including the risk factors, risk assessment values, and the determined trip types or purposes.

20 Claims, 5 Drawing Sheets

Related U.S. Application Data continuation of application No. 14/823,029, filed on Aug. 11, 2015, now Pat. No. 10,163,274, which is a continuation of application No. 13/770,515, filed on Feb. 19, 2013, now Pat. No. 9,141,995, said application No. 16/193,133 is a continuation of application No. 14/823,070, filed on Aug. 11, 2015, now Pat. No. 10,163,275, which is a continuation of application No. 13/770,650, filed on Feb. 19, 2013, now Pat. No. 9,141,582.

(60) Provisional application No. 61/739,480, filed on Dec. 19, 2012, provisional application No. 61/739,486, filed on Dec. 19, 2012.

(51) Int. Cl.
*G01S 19/01* (2010.01)
*G07C 5/00* (2006.01)

(56) References Cited

U.S. PATENT DOCUMENTS

| | | | |
|---|---|---|---|
| 5,978,729 | A | 11/1999 | Landes et al. |
| 6,253,129 | B1 | 6/2001 | Jenkins et al. |
| 7,471,192 | B2 | 12/2008 | Hara et al. |
| 7,659,827 | B2 | 2/2010 | Gunderson et al. |
| 8,085,166 | B2 | 12/2011 | Tamir et al. |
| 8,086,523 | B1 | 12/2011 | Palmer |
| 8,140,359 | B2 | 3/2012 | Daniel |
| 8,473,148 | B2 | 6/2013 | Nielsen et al. |
| 2002/0111725 | A1 | 8/2002 | Burge |
| 2003/0191568 | A1 | 10/2003 | Breed |
| 2003/0195701 | A1 | 10/2003 | Ohler |
| 2004/0209594 | A1 | 10/2004 | Naboulsi |
| 2004/0210353 | A1 | 10/2004 | Rice |
| 2005/0125148 | A1 | 6/2005 | Van Buer et al. |
| 2006/0047540 | A1 | 3/2006 | Hutten et al. |
| 2006/0078853 | A1 | 4/2006 | Lanktree |
| 2007/0005404 | A1 | 1/2007 | Raz et al. |
| 2007/0027583 | A1 | 2/2007 | Tamir et al. |
| 2007/0027726 | A1 | 2/2007 | Warren et al. |
| 2007/0282638 | A1 | 12/2007 | Surovy |
| 2008/0065427 | A1 | 3/2008 | Helitzer et al. |
| 2008/0082372 | A1 | 4/2008 | Burch |
| 2008/0167819 | A1 | 7/2008 | Breed |
| 2008/0195313 | A1 | 8/2008 | Coleman |
| 2008/0255722 | A1 | 10/2008 | McClellan et al. |
| 2008/0270519 | A1 | 10/2008 | Ekdahl et al. |
| 2009/0024419 | A1 | 1/2009 | McClellan et al. |
| 2009/0079555 | A1 | 3/2009 | Aguirre De Career et al. |
| 2009/0210257 | A1 | 8/2009 | Chalfant et al. |
| 2009/0284361 | A1 | 11/2009 | Boddie et al. |
| 2010/0030582 | A1 | 2/2010 | Rippel et al. |
| 2010/0030586 | A1 | 2/2010 | Taylor et al. |
| 2010/0157061 | A1 | 6/2010 | Katsman et al. |
| 2010/0205012 | A1 | 8/2010 | McClellan |
| 2010/0209884 | A1 | 8/2010 | Lin et al. |
| 2010/0238009 | A1 | 9/2010 | Cook et al. |
| 2010/0250021 | A1 | 9/2010 | Cook et al. |
| 2010/0299021 | A1 | 11/2010 | Jalili |
| 2010/0322476 | A1 | 12/2010 | Kanhere et al. |
| 2011/0090075 | A1 | 4/2011 | Armitage et al. |
| 2011/0106370 | A1 | 5/2011 | Duddle et al. |
| 2011/0160964 | A1 | 6/2011 | Obradovich |
| 2011/0161116 | A1 | 6/2011 | Peak et al. |
| 2011/0213628 | A1 | 9/2011 | Peak et al. |
| 2011/0307188 | A1 | 12/2011 | Peng et al. |
| 2011/0320492 | A1 | 12/2011 | Inghelbrecht |
| 2012/0029945 | A1 | 2/2012 | Altieri et al. |
| 2012/0066007 | A1 | 3/2012 | Ferrick et al. |
| 2012/0072244 | A1 | 3/2012 | Collins et al. |
| 2012/0089423 | A1 | 4/2012 | Tamir et al. |
| 2012/0194357 | A1 | 8/2012 | Ciolli |
| 2013/0096731 | A1 | 4/2013 | Tamari et al. |
| 2013/0304515 | A1 | 11/2013 | Gryan et al. |

OTHER PUBLICATIONS

Manitoba Public Insurance, "Moving Toward a Better Driver Rating System" dated 2008.

Chris Tijerina, "How Your Auto Insurance Rates Are Determined", Ezine Articles, date unknown captured May 9, 2012.

Neighborhood Link Website, Your Credit Score Affects Your Auto Insurance Rates, date unknown captured May 9, 2012.

Robin Harbage, "Usage-based Auto Insurance (UBI)" © 2010 Towers Watson.

MyDrive Solutions website, "How does MyDrive work?", date unknown, captured May 9, 2012.

Computer Weekly Website, "How pay-as-you-behave technology could transform car insurance", published Apr. 4, 2011.

Farmers Essential Life© Universal Life Website; "Universal Life Insurance Designed To Be Flexible To Fit Your Needs", www.farmers.com/universal_life_insurance.html; date unknown, captured May 9, 2012.

Golden State Mutual Life Website; "Introducing Universal Life Insurance", www.gsmlife.com/universal life-Conserv.htm; date unknown, captured May 9, 2012.

Non-Final Office Action for related U.S. Appl. No. 13/770,650 dated Feb. 26, 2014.

Final Office Action for related U.S. Appl. No. 13/770,650 dated Aug. 13, 2014.

Non-Final Office Action for related U.S. Appl. No. 13/770,650 dated Dec. 11, 2014.

Dec. 1, 2016—U.S. Non-Final Office Action—U.S. Appl. No. 14/823,070.

May 15, 2017—U.S. Final Office Action—U.S. Appl. No. 14/823,070.

Oct. 26, 2017—U.S. Non-Final Office Action—U.S. Appl. No. 14/823,070.

Mar. 8, 2018—U.S. Final Office Action—U.S. Appl. No. 14/823,070.

Aug. 27, 2018—U.S. Notice of Allowance—U.S. Appl. No. 14/823,070.

| Trip ID | Date | Source Location | Departure Time | Destination Location | Arrival Time | ... |
|---|---|---|---|---|---|---|
| ... | | | | | | |
| 014 | 1-4-13 | 3527881N, 5466124W | 19:05:34 | 3529512N, 5481223W | 19:52:11 | |
| 015 | 1-4-13 | 3529512N, 5481223W | 22:55:13 | 3527881N, 5466124W | 23:40:16 | |
| 016 | 1-5-13 | 3527881N, 5466124W | 11:15:27 | 3528990N, 5468330W | 11:18:30 | |
| 017 | 1-5-13 | 3528990N, 5468330W | 11:25:11 | 3534566N, 5500123W | 11:45:05 | |
| 018 | 1-5-13 | 3534566N, 5500123W | 12:30:44 | 3523104N, 5471809W | 12:32:51 | |
| 019 | 1-5-13 | 3523104N, 5471809W | 14:02:12 | 3527881N, 5466124W | 14:29:10 | |
| ... | | | | | | |

FIG. 4A

| Trip ID | Date | Time | Return Time | Location / Purpose | Trip Risk | Return Risk | Parking Risk | ... |
|---|---|---|---|---|---|---|---|---|
| ... | | | | | | | | |
| 0234 | 2-4-13 | 07:15:34 | 7:40:02 | ABC Elementary School | Low | Low | Low | |
| 0235 | 2-4-13 | 07:53:02 | 18:06:21 | XYZ Office Bldg. | Med | High | Low | |
| 0236 | 2-4-13 | 20:02:21 | 21:33:40 | Jim's Restaurant | Med | Low | Med | |
| 0237 | 2-5-13 | 8:04:10 | 18:05:07 | XYZ Office Bldg. | High | High | Low | |
| 0238 | 2-6-13 | 13:12:44 | 15:48:13 | Park – Baseball Game | Low | Med | Med | |
| 0239 | 2-6-13 | 16:48:13 | 19:00:38 | Shopping – Recreation | Low | Low | Med | |
| 0240 | 2-6-13 | 19:15:23 | 02:21:04 | Bar / Rest. - Recreation | Low | High | High | |
| ... | | | | | | | | |

FIG. 4B

DRIVING TRIP AND PATTERN ANALYSIS

CROSS REFERENCE TO RELATED APPLICATIONS

The present application is a continuation of and claims priority to co-pending U.S. application Ser. No. 16/93,133, filed Nov. 16, 2018, and entitled Driving Trip and Pattern Analysis, which is a continuation of and claims priority to U.S. application Ser. No. 14/823,029, filed Aug. 11, 2015, and entitled "Driving Trip and Pattern Analysis," which is a continuation of and claims priority to U.S. application Ser. No. 13/770,515 (now U.S. Pat. No. 9,141,995), filed Feb. 19, 2013, and entitled "Driving Trip and Pattern Analysis," which is a non-provisional of and claims priority to U.S. Provisional Application No. 61/739,480, entitled "Driving Trip and Pattern Analysis," filed Dec. 19, 2012, the contents of these applications are hereby incorporated by reference in their entirety for all purposes.

In addition, as indicated above, the present application is a continuation of and claims priority to co-pending U.S. application Ser. No. 16/193,133, filed Nov. 16, 2018, and entitled Driving Trip and Pattern Analysis, which is a continuation of and claims priority to U.S. application Ser. No. 14/823,070, filed Aug. 11, 2015, and entitled "Driving Trip and Pattern Analysis" which is a continuation of and claims priority to U.S. application Ser. No. 13/770,650 (now U.S. Pat. No. 9,141,582), filed Feb. 19, 2013, and entitled, "Driving Trip and Pattern Analysis" which is a non-provisional of and claims priority to U.S. Provisional Application No. 61/739,486, entitled "Driving Trip and Pattern Analysis," filed Dec. 19, 2012, the contents of which are hereby incorporated by reference in their entirety for all purposes.

TECHNICAL FIELD

Aspects of the disclosure generally relate to the analysis of driving data and calculation of driver scores. In particular, various aspects of the disclosure include a framework for evaluating one or more driving trips by a vehicle, identifying driving trip patterns, and performing risk analyses on the driving trips and patterns.

BACKGROUND

Telematics includes the use of technology to communicate information from one location to another. Telematics has been used for various applications, including for the exchange of information with electronic sensors. As telematics technology has progressed, various communication methodologies have been incorporated into automobiles and other types of vehicles.

Telematics systems such as on-board diagnostics (OBD) systems may be used in automobiles and other vehicles. OBD systems may provide information from the vehicle's on-board computers and sensors, allowing users to monitor a wide variety of information relating to the vehicle systems, such as engine RPM, emissions control, coolant temperature, vehicle speed, timing advance, throttle position, and oxygen sensing, and many other types of data. Vehicles may also include global positioning system (GPS) devices installed within or operating at the vehicle, configured to collect vehicle location and time data. Telematics devices installed within vehicles may be configured to access the vehicle computers, sensor data, and GPS device data and transmit the data to a display within the vehicle, a personal computer or mobile device, or to a centralized data processing system. Data obtained from OBD systems has been used for a variety of purposes, including vehicle maintenance, diagnosis, and analysis, and data obtained from GPS devices has been used for navigation applications and other purposes.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for receiving and analyzing vehicle location data and vehicle driving data, and calculating or adjusting a driver score based on the analyzed data. One or more computing devices within a vehicle, for example, GPS devices or telematics devices, may be configured to collect vehicle location data and/or vehicle operational data, and transmit the data to a vehicle operation computer system or a driving analysis server. Based on the vehicle location and operational data, a driving analysis server may be configured to identify one or more driving trips by the vehicle, and determine risk assessment values corresponding to the driving trips. For example, the driving analysis server may be configured to identify destination locations for the vehicle's driving trips, and perform risk analyses for driving trips to the destinations, return trips from the destination, and parking at the destination location, at the times corresponding to the vehicle's driving trips. A specific driving trip type or purpose also may be identified, along with specific businesses, activities, or property usages associated with the destination locations of the driving trips. Driving scores may be calculated based on risk assessment values and/or vehicle driving usage data determined during the analysis of the vehicle driving trips.

In accordance with further aspects of the present disclosure, driving trip patterns may be identified among driving trips having similar characteristics, such as similar driving trip source and destination locations, and the similar starting and ending times. A driving analysis server may receive and analyze driving trip data and determine that the driving trip data corresponds to an existing driving trip pattern. Risk assessment data associated with a driving trip pattern may be retrieved and used for analyzing the risk of a current driving trip matching the pattern. Driving behavior variations also may be identified and analyzed based on differences between a current driving trip data and corresponding driving trip pattern data.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 4A and 4B are example tables containing data corresponding to a set of driving trips by a vehicle, according to one or more aspects of the disclosure.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
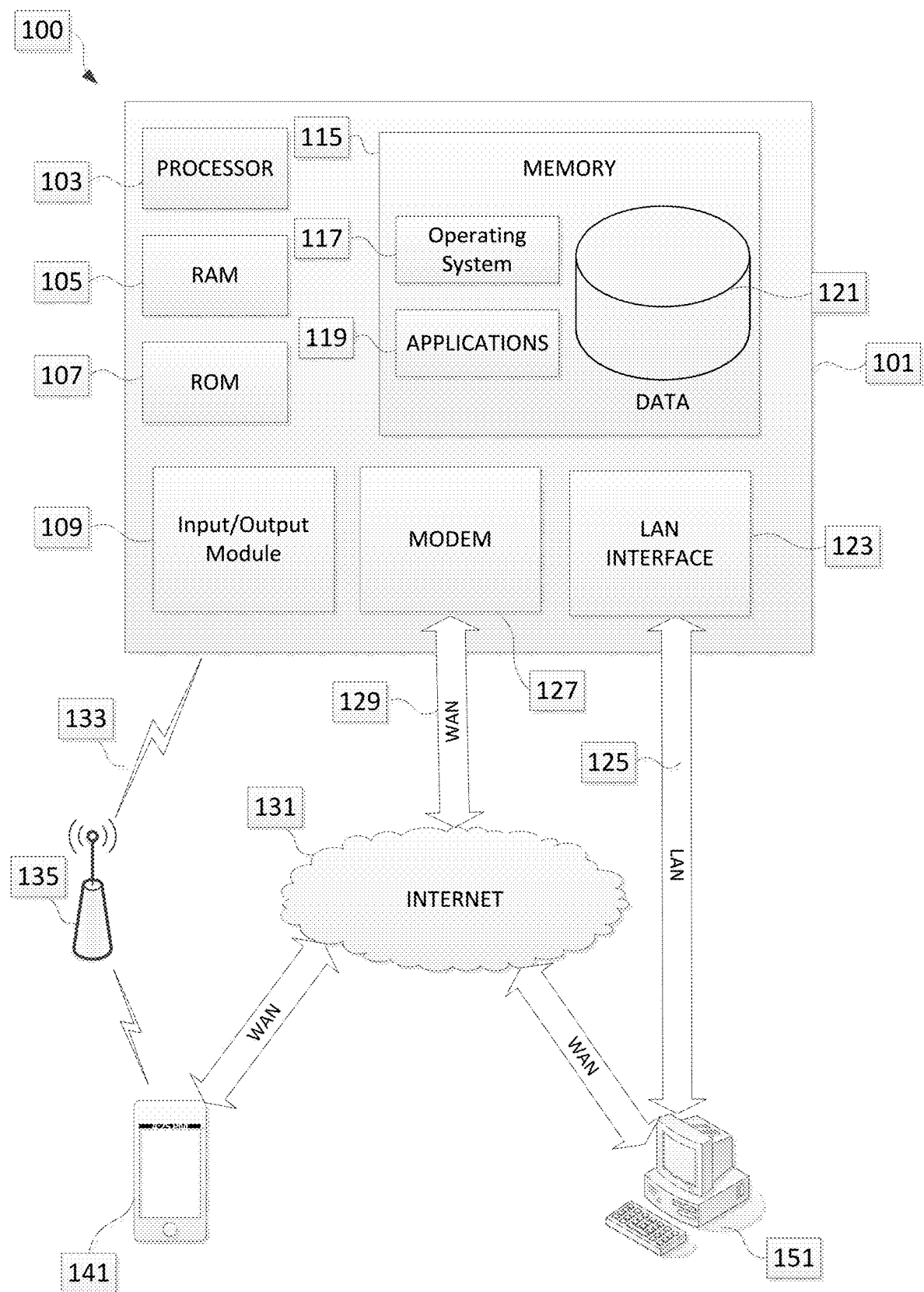
FIG. 1 illustrates a network environment and computing systems that may be used to implement aspects of the disclosure.

FIG. 1 illustrates a block diagram of a computing device (or system) 101 in communication system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as a driving analysis server or system, configured as described herein for receiving and analyzing vehicle driving data and calculating driver scores based on driving trip characteristics and risk assessment values of identified driving trips.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the driving analysis system 101 to execute a series of computer-readable instructions to receive driving data from a vehicle, identify driving trips and/or driving trip characteristics, and calculate risk assessment values and driver scores based on the analysis of driving trips.

The driving analysis system 101 may operate in a networked environment 100 supporting connections to one or more remote computers, such as terminals 141 and 151. The terminals 141 and 151 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the driving analysis system 101. The network connections depicted in FIG. 1 include a local area network (LAN) 125 and a wide area network (WAN) 129, and a wireless telecommunications network 133, but may also include other networks. When used in a LAN networking environment, the driving analysis system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the driving analysis server/system 101 may include computer executable instructions (e.g., driving analysis programs and driver score algorithms) for receiving vehicle driving data, identifying driving trips and characteristics of driving trips, identifying driving events, retrieving additional data (e.g., location data, weather data, and traffic data, etc.) associated with the driving trips and driving events, analyzing the data driving trip data and characteristics, performing driving trip data analyses, and determining risk factors, risk assessment values, and/or driving score computations for one or more vehicles or drivers, and performing other related functions as described herein.

As used herein, a driver score (or driving score) may refer to a measurement of driving abilities, safe driving habits, and other driver information. A driver score may be a rating generated by an insurance company, financial instruction, or other organization, based on the driver's age, vision, medical history, vehicle usage, driving record, and/or other account data relating to the driver. For example, an insurance company server 101 may periodically calculate driver scores for one or more of the insurance company's customers, and may use the driver scores to perform insurance analyses and determinations (e.g., determine coverage, calculate premiums and deductibles, award safe driver discounts, etc.). As discussed below, the driver score may be increased or decreased based on the real-time data collected by vehicle sensors, telematics devices, and other systems for measuring vehicle usage and driving performance.

For example, vehicle driving data may be received from the vehicle, while additional data relating to the usage of the vehicle (e.g., locations where the vehicle is being driven, risks associated with those locations, weather conditions and traffic conditions for when and where the vehicle is being driven, etc.) may be retrieved from the vehicle or other data sources. If a driver primarily uses the vehicle for low-risk driving trips, such as commuting to work or school, and regularly drives in good weather and to locations with low risk traffic and/or parking conditions, then the vehicle or driver may receive a higher driver score. Alternatively, if a driver regularly drives to high risk locations (e.g., locations with higher instances of accidents or vehicle damage), or regularly drives during bad weather or to locations with high risk traffic and/or parking conditions, then the vehicle or driver may receive a lower driver score. It should be understood that a driver score, as used herein, may be associated with an individual, group of individuals, or a vehicle. For instance, a family, group of friends or co-workers, or other group that shares a vehicle, may have a single driver score that is shared by the group. Additionally, a vehicle may have an associated driver score that is based on one or more primary drivers of the vehicle and can be affected by the vehicle usage and driving behavior of any the vehicle's drivers. In other examples, a vehicle may be configured to identify different drivers, and each driver of the vehicle may have a separate driver score.

Figure 2:
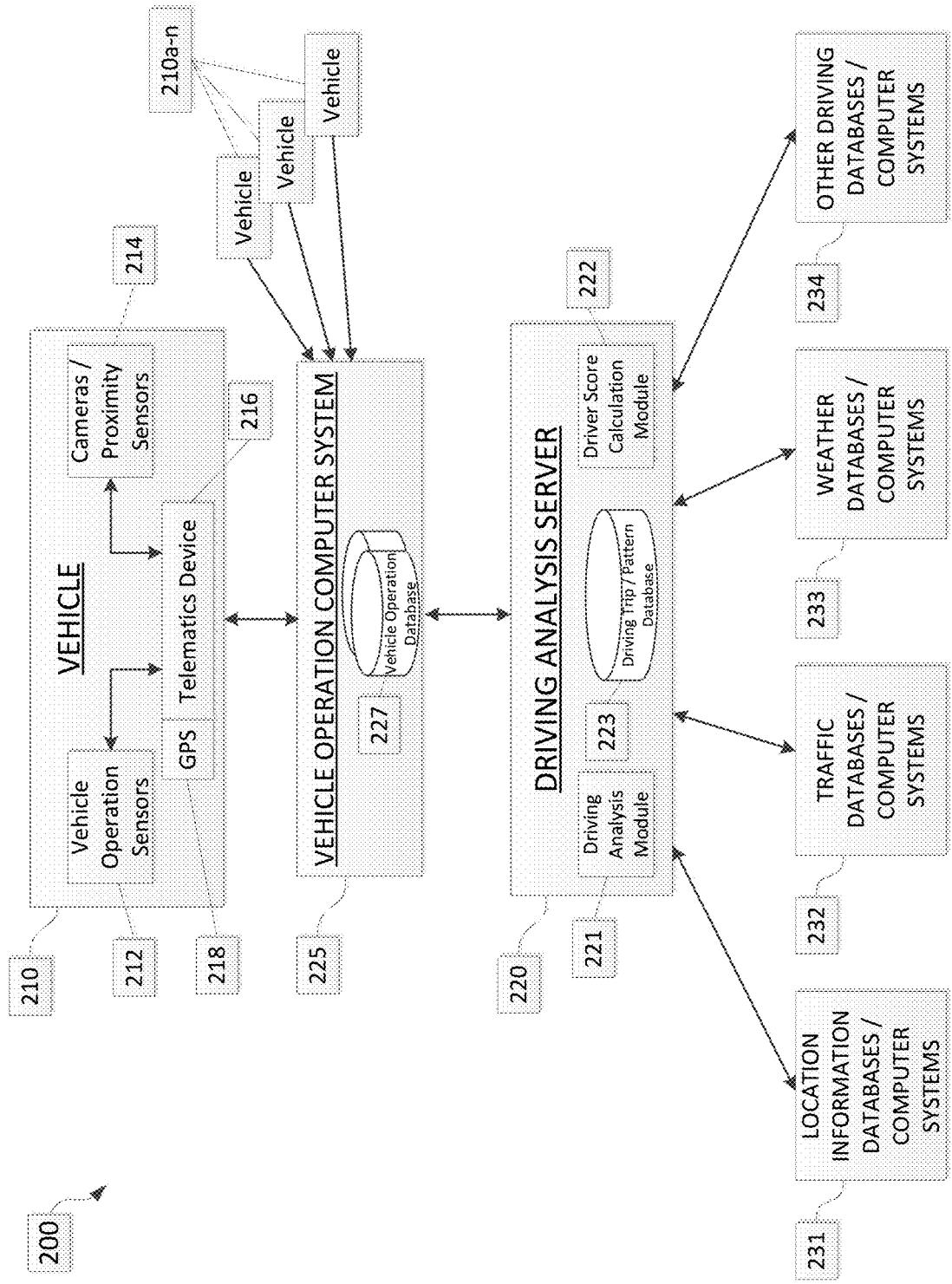
FIG. 2 is a diagram of a driving analysis system, according to one or more aspects of the disclosure.

FIG. 2 is a diagram of an illustrative driving analysis system 200. Each component shown in FIG. 2 may be implemented in hardware, software, or a combination of the two. Additionally, each component of the driving analysis system 200 may include a computing device (or system) having some or all of the structural components described above for computing device 101.

The driving analysis system 200 shown in FIG. 2 includes a vehicle 210, such as an automobile, motorcycle, or other vehicle for which a driving trip or driving pattern analysis may be performed and for which a driver score may be calculated. The vehicle 210 may include vehicle operation sensors 212 capable of detecting and recording various conditions at the vehicle and operational parameters of the vehicle. For example, sensors 212 may detect and store data corresponding to the vehicle's speed, distances driven, rates of acceleration or braking, and specific instances of sudden acceleration, braking, and swerving. Sensors 212 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 212 may detect and store the external driving conditions, for example, external temperature, rain, snow, light levels, and sun position for driver visibility. Sensors 212 also may detect and store data relating to moving violations and the observance of traffic signals and signs by the vehicle 210. Additional sensors 212 may detect and store data relating to the maintenance of the vehicle 210, such as the engine status, oil level, engine coolant temperature, odometer reading, the level of fuel in the fuel tank, engine revolutions per minute (RPMs), and/or tire pressure.

The vehicle 210 also may include one or more cameras and proximity sensors 214 capable of recording additional conditions inside or outside of the vehicle 210. Internal cameras 214 may detect conditions such as the number of the passengers in the vehicle 210, and potential sources of driver distraction within the vehicle (e.g., pets, phone usage, unsecured objects in the vehicle). External cameras and proximity sensors 214 may detect other nearby vehicles, traffic levels, road conditions, traffic obstructions, animals, cyclists, pedestrians, and other conditions that may factor into driving trip and/or driving data analyses.

The operational sensors 212 and the cameras and proximity sensors 214 may store data within the vehicle 210, and/or may transmit the data to one or more external computer systems (e.g., a vehicle operation computer system 225 and/or a driving analysis server 220). As shown in FIG. 2, the operation sensors 212, and the cameras and proximity sensors 214, may be configured to transmit data to a vehicle operation computer system 225 via a telematics device 216. In other examples, one or more of the operation sensors 212 and/or the cameras and proximity sensors 214 may be configured to transmit data directly without using a telematics device 216. For example, telematics device 216 may be configured to receive and transmit data from operational sensors 212, while one or more cameras and proximity sensors 214 may be configured to directly transmit data to a vehicle operation computer system 225 or a driving analysis server 220 without using the telematics device 216. Thus, telematics device 216 may be optional in certain embodiments where one or more sensors or cameras 212 and 214 within the vehicle 210 may be configured to independently capture, store, and transmit vehicle operation and driving data.

Telematics device 216 may be a computing device containing many or all of the hardware/software components as the computing device 101 depicted in FIG. 1. As discussed above, the telematics device 216 may receive vehicle operation and driving data from vehicle sensors 212, and proximity sensors and cameras 214, and may transmit the data to one or more external computer systems (e.g., a vehicle operation computer system 225 and/or a driving analysis server 220) over a wireless transmission network. Telematics device 216 also may be configured to detect or determine additional types of data relating to real-time driving and the condition of the vehicle 210. In certain embodiments, the telematics device 216 may contain or may be integral with one or more of the vehicle sensors 212 and proximity sensors and cameras 214 discussed above, and/or with one or more additional sensors discussed below.

Additionally, the telematics device 216 may be configured to collect data regarding the number of passengers and the types of passengers (e.g. adults, children, teenagers, pets, etc.) in the vehicle 210. The telematics device 216 also may be configured to collect data related to a driver's movements or the condition of a driver. For example, the telematics device 216 may include or communicate with sensors that monitor a driver's movements, such as the driver's eye position and/or head position, etc. Additionally, the telematics device 216 may collect data regarding the physical or mental state of the driver, such as fatigue or intoxication. The condition of the driver may be determined through the movements of the driver or through sensors, for example, sensors that detect the content of alcohol in the air or blood alcohol content of the driver, such as a breathalyzer.

The telematics device 216 also may collect information regarding the vehicle's location at different times, the driver's route choice, whether the driver follows a given route, and may classify the type of trip (e.g., work or school commute, shopping, church, park, errands, house of friend or relation, etc.). To determine the vehicle's location, route, and other data, the telematics device 216 may include or may receive data from a Global Positioning System (GPS) 218, or other locational device. The GPS system 218 may be integrated into the telematics device 216, or one or more other devices within the vehicle 210 (e.g., a GPS navigation device, mobile telephone, or other mobile GPS-enabled device, etc.). Vehicle location data may be received by the telematics device 216 from the GPS system 218, and then transmitted to one or more additional systems, such as the vehicle operation computer system 225 or driving analysis server 220. In other examples, one or more GPS systems 218 within the vehicle 210 may transmit vehicle location data directly to the vehicle operation computer system 225, driving analysis server 220, or other additional system.

The telematics device 216 also may store the type of the vehicle 210, for example, the make, model, trim (or sub-model), year, and/or engine specifications. The vehicle type may be programmed into the telematics device 216 by a user or customer, determined by accessing a remote computer system, such as an insurance company or financial institution server, or may be determined from the vehicle itself (e.g., by accessing the vehicle's 210 computer systems).

Vehicle operation computer system 225 may be a computing device separate from the vehicle 210, containing some or all of the hardware/software components as the computing device 101 depicted in FIG. 1. The vehicle operation computer system 225 may be configured to receive and store the vehicle operation data discussed above from vehicle 210, and similar vehicle operation data from one or more other vehicles 210a-n. In the example shown in FIG. 2, the vehicle operation computer system 225 includes a vehicle operation database 227 that may be configured to store the vehicle operation data collected from the vehicle sensors 212, proximity sensors and cameras 214, telematics devices 216, and GPS devices 218 of a plurality of vehicles.

Data stored in the vehicle operation database 227 may be organized in any of several different manners. For example, a table in the vehicle operation database 227 may contain all of the vehicle operation data for a specific vehicle 210, similar to a vehicle event log or vehicle driving trip log. Other tables in the vehicle operation database 227 may store certain types of data for multiple vehicles. For instance, tables may store specific driving behaviors (e.g., driving speed, acceleration and braking rates, swerving, tailgating, use of seat belts, turn signals or other vehicle controls, etc.) for multiple vehicles 210 at specific locations, such as specific neighborhoods, roads, or intersections. Vehicle operation data may also be organized by location and/or time, so that the driving trips, events or behaviors of multiple vehicles 210 may be stored or grouped by time (e.g., morning, afternoon, late night, rush hour, weekends, etc.) as well as location.

The system 200 also may include a driving analysis server 220, containing some or all of the hardware/software components as the computing device 101 depicted in FIG. 1. The driving analysis server 220 may include hardware, software, and network components to receive vehicle operation data from the vehicle operation computer system 225 and/or directly from a plurality of vehicles 210. The driving analysis server 220 and the vehicle operation computer system 225 may be implemented as a single server/system, or may be separate servers/systems. In some examples, the driving analysis server 220 may be a central server configured to receive vehicle operation data from a plurality of remotely located vehicle operation computer systems 225.

As shown in FIG. 2, driving analysis server 220 may include a driving analysis module 221 and a driver score calculation module 222. Modules 221 and 222 may be implemented in hardware and/or software configured to perform a set of specific functions within the driving analysis server 220. For example, the driving analysis module 221 and the driver score calculation module 222 may include one or more driving trip analysis algorithms, driving pattern analysis algorithms, and driver score calculation algorithms, which may be executed by one or more software applications running on generic or specialized hardware within the driving analysis server 220. The driving analysis server 220 also may include one or more databases 223 for storing driving trip data and driving trip pattern data for vehicles 210. The driving analysis module 221 may use vehicle operation data received from the vehicle 210 or the vehicle operation computer system 225 (e.g., vehicle location and time data), and driving trip and driving pattern data received from the database 223, to perform driving trip and driving pattern analyses for vehicles 210. The driver score calculation module 222 may calculate or adjust a driver score for a driver of a vehicle 210 based on the analyses of the driving trips and patterns performed by module 221 for the vehicle 210. Further descriptions and examples of the algorithms, functions, and analyses that may be executed using the driving analysis module 221, the driver score calculation module 222, and the driving trip and pattern database 223 are described below in reference to FIGS. 3-5.

To perform driving trip and pattern analyses, and driver score calculations, the driving analysis server 220 may initiate communication with and/or retrieve data from one or more vehicles 210, vehicle operation computer systems 225, and additional computer systems 231-234 storing data that may be relevant to the driving trip and pattern analyses and driver score calculations. For example, the driving analysis server 220 may receive data to perform driving trip and pattern analyses, risk factor and risk assessment value determinations, and driver score calculations, from one or more location information databases or computer systems 231, one or more traffic data storage systems 232, one or more weather data storage systems 233, and one or more additional driving databases or computer systems 234.

Location information databases 231 may store information regarding a plurality of driving destinations or other locations associated with vehicles 210. For example, a location information database 231 may store tables of GPS coordinates (or other location data) for a plurality of locations, along with various properties or characteristics for each location. Sets of GPS coordinates may be associated with different types of locations (e.g., schools, parks, restaurants, airports, gas stations, stores, golf courses, residential addresses, parking lots, etc.) and/or may be associated with specific locations (e.g., ABC Elementary School, XYZ Office Building, JKL Restaurant, etc.). Additional data may be stored regarding each specific location or set of GPS coordinates, such as various risk factors and risk assessment values associated with the location. For instance, for a first location identified by GPS coordinates, or identified by name for a specific business, activity, or property usage, risk data may be stored corresponding to the vehicle damage risk at the first location (e.g., accident statistics, theft and vandalism statistics, or other vehicle damage risks), vehicle parking availability at the first location (e.g., garage, outdoor lot, street parking, valet, etc.), and/or data regarding previous vehicle-related incidents occurring at the location (e.g., insurance claims, vehicles towing records, police reports, etc.)

Traffic databases and other traffic storage systems 232 may store data corresponding to the amount of traffic and certain traffic characteristics (e.g., amount of traffic, average driving speed, traffic speed distribution, and numbers and types of accidents, etc.) at various specific locations and times. Traffic databases 232 also may store image and video data recorded by traffic cameras various specific locations and times. Weather data storage systems 233, such as weather databases, may store weather data (e.g., rain, snow, sleet, hail, temperature, wind, road conditions, visibility, etc.) at different locations and different times. One or more additional driving databases/systems 234 may store additional driving data from one or more different data sources or providers which may be relevant to the driving trip and pattern analyses and/or driver score calculations performed by the driving analysis server 220. Additional driving databases/systems 234 may store data regarding events such as road hazards and traffic accidents, downed trees, power outages, road construction zones, school zones, and natural disasters that may affect the driving trip and pattern analyses and/or driver score calculations performed by the driving analysis server 220. As discussed below in reference to FIGS. 3-5, the driving analysis server 220 may retrieve and use data from databases/systems 231-234 to identify and analyze driving trips, determine driving patterns, evaluate driving events, and calculate driver scores based on vehicle driving data received from vehicles 210.

Figure 3:
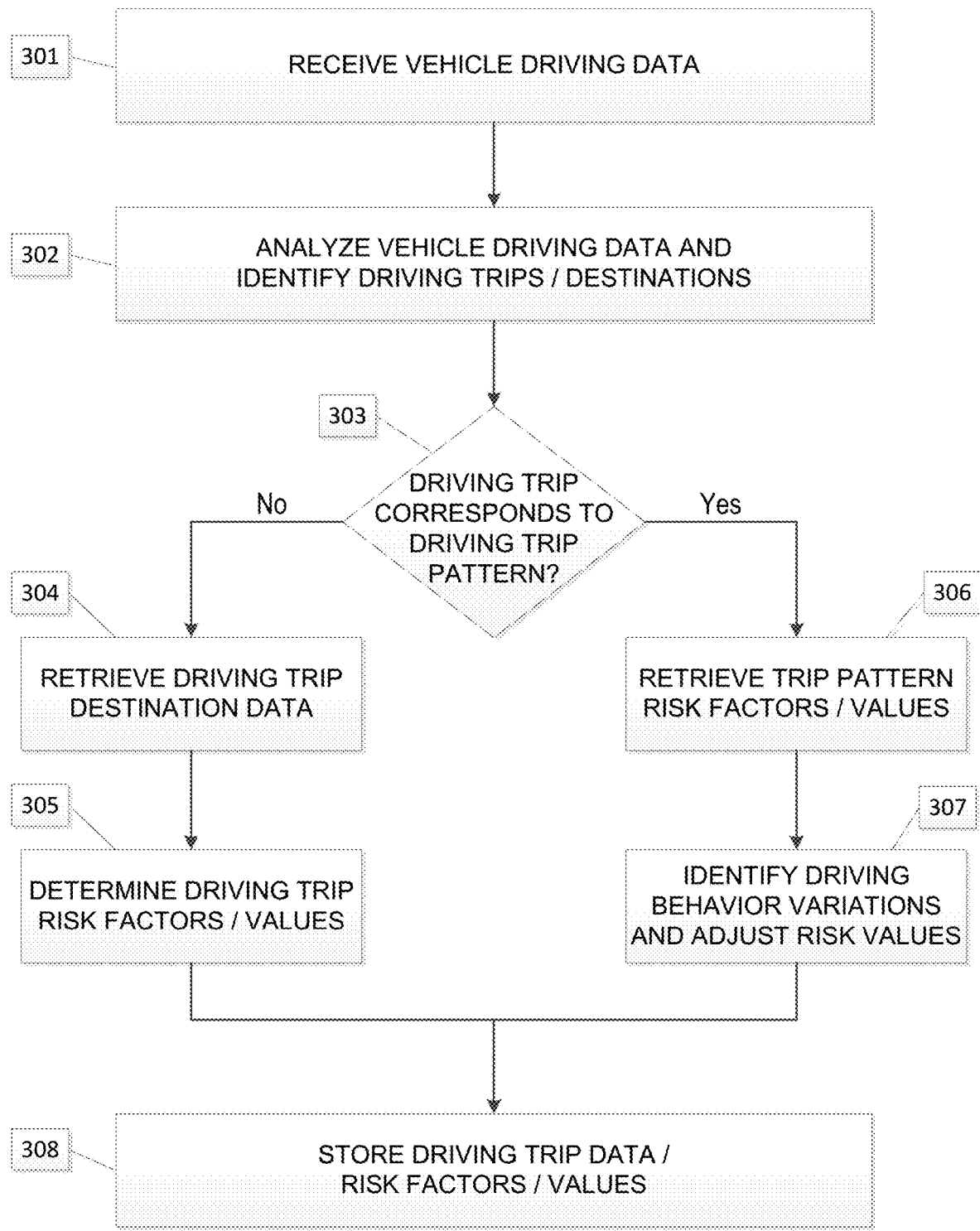
FIG. 3 is a flow diagram illustrating an example method of performing a driving trip analysis and determining driving trip risk factors and risk assessment values, according to one or more aspects of the disclosure.

FIG. 3 is a flow diagram illustrating an example method of performing a driving trip analysis and determining driving trip risk factors and risk assessment values. This example method may be performed by one or more computing devices (e.g. driving analysis server 220, vehicle operation computer system 225, and vehicle telematics device 216) in the driving analysis system 200.

Figure 5:
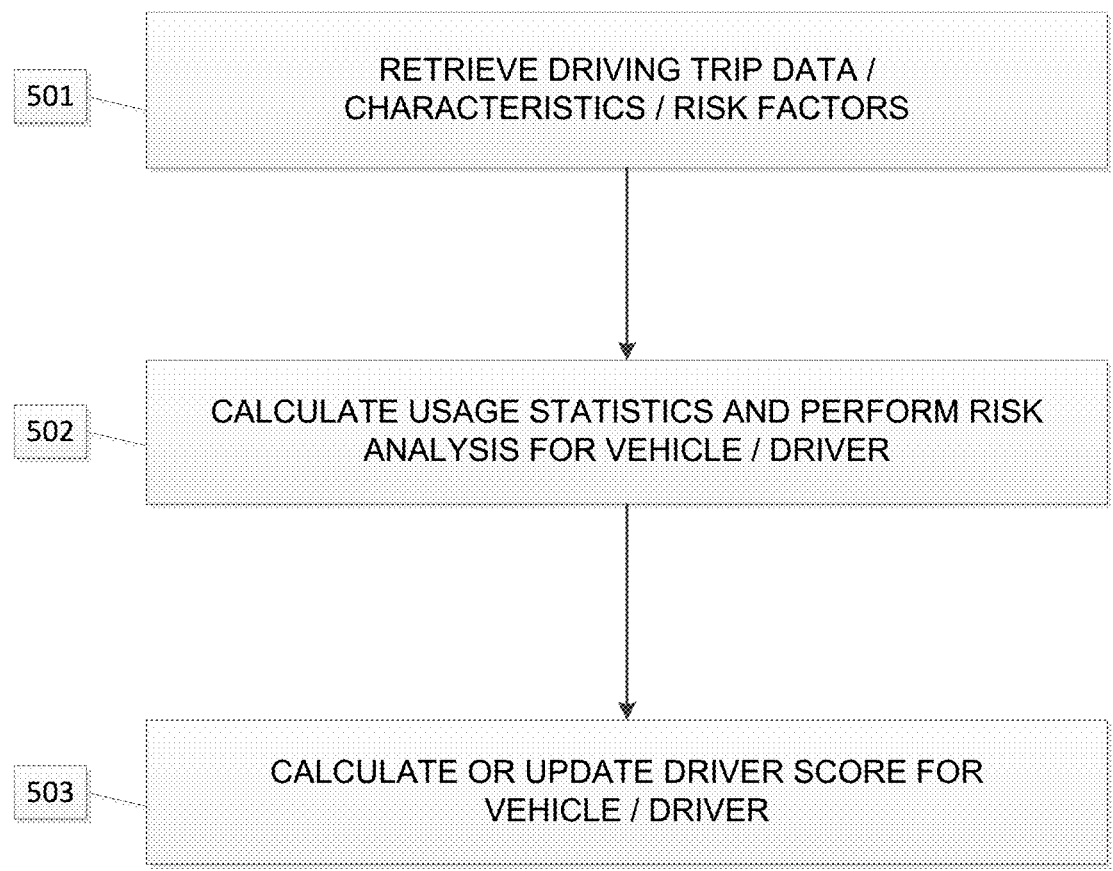
FIG. 5 is a flow diagram illustrating an example method of calculating or updating a driver score based on an analysis of driving trip data, according to one or more aspects of the disclosure.

The steps in the example method of FIG. 3, along with the steps in the example method of FIG. 5, describe performing various analyses of driving data to identify and characterize driving trips taken by drivers or vehicles 210, and then calculating driver scores based on the risk analyses associated with the driving trips. For instance, low risk driving trips may be identified as trips with minimal risk of accidents, vehicle theft, vandalism, other vehicle damage, or other incidents that may result in financial or bodily harm to a driver, passenger, or the vehicle. Routine driving trips to well-known and safe locations (e.g., commuting to and from a workplace, dropping kids off at school or at an activity, running errands near home, etc.) may be examples of relatively low risk driving trips in certain circumstances. In contrast, higher risk driving trips may be identified as trips with a greater risk of accidents, vehicle theft, vandalism, other vehicle damage, or other incidents that may result in financial or bodily harm to a driver, passenger, or the vehicle. Driving trips to unfamiliar or high risk locations, driving trips in adverse traffic or weather conditions, and driving trips in which the vehicle is parked is an unprotected or high risk parking area for an extended period of time, may be examples of relatively high risk driving trips in certain circumstances. As discussed below, vehicles and drivers primarily taking low risk driving trips may be assigned more favorable (e.g., higher) driver scores, while vehicles and drivers primarily taking high risk driving trips may be more assigned less favorable (e.g., lower) driver scores.

In step 301, a driving analysis server 220 may receive vehicle operation data (or driving data) for one or more vehicles 210. As described above in reference to FIG. 2, the driving analysis server 220 may receive vehicle operation data from one or more vehicle operation computer systems 225 and/or directly from telematics devices 216, GPS devices 218 or other systems within the vehicles 210. The vehicle driving data may correspond to location and time data collected by GPS device 218 or telematics device 216, along with vehicle sensor data or camera data collected by sensors and cameras 212 and 214 and/or additional data collected other systems within a vehicle 210. Vehicle location data and time data may be received from the same sources as other vehicle operation data, or may be collected by different data sources or generated by the driving analysis server 220. For example, the driving analysis server 220 may receive vehicle operation data from a vehicle operation system 225, and then may initiate communication with the vehicle's GPS device 218, telematics device 216, a driver's mobile phone, a remote GPS server, time server, and/or other systems to determine the vehicle locations and times that correspond to the received vehicle operation data.

In certain embodiments, telematics devices 216, GPS devices 218, vehicle operation systems 225, and other data sources may transmit vehicle operation data for a vehicle 210 to the driving analysis server 220 in real-time (or near real-time). The driving analysis server 220 may be configured to receive the vehicle operation data, and then perform real-time (or near real-time) driving trip analyses and driver score calculations for the vehicle 210. In other embodiments, vehicle operation data might not be transmitted in real-time but may be sent periodically (e.g., hourly, daily, weekly, etc.) by telematics devices 216, GPS devices 218, or vehicle operation systems 225. Periodic transmissions of vehicle operation data may include data for a single vehicle or single driver, or for multiple vehicles or drivers. The driving analysis server 220 may be configured to receive the periodic transmissions, and then to perform periodic driving trip and pattern analyses, and driver score calculations, for one or more vehicles and drivers.

In step 302, the driving analysis server 220 may analyze the driving data received in step 301 and may identify one or more driving trips and/or destinations for a vehicle 210. A driving trip may refer to a one-way trip (i.e., point to point), round trip, or multi-point driving trip in which the vehicle 210 is driven from a source location to a destination location. The driving analysis server 220 may identify the source and destination locations for driving trips by analyzing the location data (e.g., GPS coordinates) and time data from a vehicle 210. Using the vehicle location and time data, the driving analysis server 220 may determine when and where the vehicle 210 was driven, including when, where, and for how long the vehicle was stopped. For example, GPS location and time data may indicate that a vehicle 210 was driven from Point A to Point B, was stopped at Point B for one hour, then was driven from Point B to Point C, was stopped at Point C for two hours, and then was driving from Point C back to Point A. In this example, the driving analysis server 220 may identify Point A as a source of a driving trip, and may identify Point B and Point C as the destinations of the driving trip. Alternatively, the driving analysis server 220 may identify each of Points A, B, and C as destinations of a driving trip, or may identify this driving trip as three separate driving trips (Point A to Point B, Point B to Point C, and Point C to Point A), each with a single source and a destination location.

Along with location data (e.g., GPS coordinates) and time data, the driving analysis server 220 may use additional vehicle driving data to identify driving trips and trip characteristics, such as source locations, destination locations, driving times, and parking times. For example, a short period of time when the vehicle 210 does not move may correspond to a trip destination or merely to a traffic jam, train crossing, or construction zone, etc. Therefore, in certain embodiments the driving analysis server 220 may use vehicle sensor data to determine when the vehicle is turned on and off, when the vehicle is in gear or not in gear, when the vehicle's hazard lights are on, when the vehicle's doors were opened, and other vehicle sensor data that may allow the driving analysis server 220 to distinguish between a driving trip destination and a traffic jam or other delay.

The driving analysis server 220 also may use one or more time thresholds for identifying driving trips and determining driving trip sources and destinations. For example, when a vehicle 210 is stopped for longer than a time threshold (e.g., 1 minute, 2 minutes, 5 minutes, etc.) then the driving analysis server 220 may determine that the stop is a destination of a driving trip. For stops shorter than the time threshold, the driving analysis server 220 may determine that the stop is a not destination of a driving trip, but rather is just a short delay on route to a driving trip destination.

Additionally, the driving analysis server 220 may compare the vehicle location and time data to certain locations associated with the vehicle 210 or the drivers of the vehicle 210. For example, the driving analysis server 220 may receive a vehicle's home location, work and school locations, and other locations associated with the vehicle 210 or its drivers. Such location data may be received from the vehicle itself (e.g., from telematics device 216 or GPS device 218), from a user via a user interface of the driving analysis server 220, or from another data source (e.g., a computer system of a governmental entity, insurance company, or financial institution) associated with the vehicle 210 or a driver of the vehicle 210. In other examples, the driving analysis server 220 may identify home locations, work or school locations, and/or other locations associated with vehicles 210 or drivers by analyzing the location and time driving data received in step 301 over a period of time, and then identifying home locations (e.g., as the most common overnight location of the vehicle), work or school locations (e.g., as the most common weekday daytime locations of the vehicle), and other locations based on the received driving data. After identifying a vehicle's home location, work or school locations, and/or other locations associated with the vehicle 210 or its drivers, these locations may be used in step 302 to identify starting and ending points for driving trips, identify other driving destinations, and identify patterns of driving trips.

After one or more driving trips (and/or driving destinations) have been identified for a vehicle 210 in step 302, the driving analysis server 220 may determine whether or not the identified driving trips correspond to a driving trip pattern for the vehicle 210 in step 303. A driving trip pattern may be identified when a vehicle 210 and/or has multiple different driving trips having certain similar characteristics, for example, similar starting and ending locations, similar driving times, and similar driving routes, etc. For instance, a Monday morning driving trip for a vehicle 210 from a first location to a second location may match a driving pattern if the vehicle 210 has driven from the same first location to the same second location almost every weekday morning for the past several weeks, months, or years. In this example, the driving trip may correspond to a driving pattern for a weekday morning commute from the vehicle's 210 home location to a workplace of the vehicle's 210 primary driver.

In order to determine if a driving trip corresponds to a driving trip pattern for the vehicle 210, the driving trip data and destination data identified in step 302 may be compared to similar data stored for previous driving trips driven by the vehicle 210 or driver, or previous driving patterns associated with the vehicle 210 or driver. Previous driving trip data and driving pattern data may be stored at the vehicle 210 (e.g., in a telematics device 216 or GPS device 218), at the driving analysis server 220 (e.g., in the driving trip and driving pattern database 223), and/or in one or more driving trip or driving pattern databases at other locations.

Referring briefly to FIG. 4A, an example driving trip data table is shown including source and destination location information (e.g., in GPS coordinates), and departure and arrival times (e.g., in hours, minutes, and seconds), among other fields, for a plurality of one-way driving trips by a vehicle 210. Using this example, in step 303, the driving trip starting location, starting time, destination location, and destination time for a current driving trip may be compared to the corresponding fields in FIG. 4A for each driving trip previously stored for the vehicle 210. If the data for the current driving trip matches the data for one or more (or a threshold number of) previous driving trips, then the driving analysis server 220 may determine that the current driving trip corresponds to an existing driving pattern (303:Yes). Alternatively, if the data for the current driving trip does not match the data for at least a predetermined number of previous driving trips, then the driving analysis server 220 may determine that the current driving trip does not correspond to an existing driving pattern (303:No).

To determine whether or not current driving trip data (e.g., start and destination locations, driving times, etc.) matches the data for a previous driving trip, the driving analysis server 220 may use one or more location thresholds or time thresholds. That is, for a driving trip to correspond to a driving trip pattern (e.g., a morning commute driving pattern, an evening commute driving pattern, an afternoon soccer practice driving pattern, a weekend grocery store driving pattern, etc.), the driving locations and times need not correspond exactly, but may be close enough to indicate that the driving trip matches the same pattern. For instance, when a driver commutes to work in the morning, the driver might not leave at exactly the same minute and second every morning, might not take exactly the same route, and might not park in exactly the same location at work. Therefore, the driving analysis server 220 may use time thresholds (e.g., departure or arrival within 10 minutes, 20 minutes, 1 hour, 2 hours, etc.) and/or location thresholds (e.g., starting or destination location within 1 block, 5 blocks, 100 meters, 1 mile, etc.), when comparing the current driving trip data to previous driving trip data to determine whether the driving trip matches a driving trip pattern.

Using the example driving trip data table in FIG. 4A, source and destination location and time data may be used to determine when driving trips correspond to a driving trip pattern. In other examples, additional types of data may be used in driving trip pattern determinations in step 303, such as the day of the week (e.g., weekday or weekend patterns), the driving route taken between the source and destination, and/or the identity of the specific driver.

Additionally, when determining whether or not a current driving trip corresponds to a driving trip pattern, the driving analysis server 220 may compare the number of matching previous driving trips to a minimum driving pattern threshold. For example, if the current driving trip data matches only one previous driving trip in a driving trip database for a vehicle 210, then the driving analysis server 220 may determine that the current driving trip does not correspond to a driving pattern. In this example, the driving analysis server 220 may identify the current driving trip as matching an existing driving pattern only if it matches a minimum threshold number (e.g., 5, 10, 100, etc.) or threshold frequency (1 per week, 100 per year, etc.) of previous driving trips.

In certain examples, the current driving trip data may be compared to a set of driving trip pattern profiles in step 303, instead of (or in addition to) comparing the current driving trip data to previous driving trip data. For instance, the driving analysis server 220 may identify one or more driving trip patterns for a vehicle 210 based on an analysis of previous driving trips for that vehicle. In such an analysis, if a threshold number or threshold frequency of driving trips for a vehicle 210 have similar characteristics, then the driving analysis server may create a new driving trip pattern profile in a driving trip and driving pattern database 223. The driving trip pattern profile may be created using statistical analyses to define the parameters of driving trips matching the pattern, for example, one or more ranges of source and destination locations, one or more ranges of departure or arrival times, etc. In such examples, it may be more efficient to compare the current driving trip data to a fewer number of driving trip pattern profiles in database 223, rather than comparing the current driving trip data to every previous driving trip data for the vehicle 210.

If the driving trip and destination data identified in step 302 does not correspond to a driving trip pattern (303:No), then in step 304 the driving analysis server 220 may retrieve information regarding the driving trip destinations from one or more location databases 231. Location databases 231 may include public or private databases (e.g., governmental records, insurance databases, map servers, etc.) that match geographic coordinates to street addresses, business or property names, or the like. For example, the driving analysis server 220 may use the GPS coordinates or other location data corresponding to one or more driving trip destinations to retrieve a street address, a name of a business or organization, a type of business, a property usage, an event or activity, or other information associated with the destination GPS coordinates. The location data retrieved in step 304 may include general location information such as a business or property type/usage (e.g., restaurant, gas station, park, factory, grocery store, arena, parking lot, residential home, etc.), and/or may include specific location information such as business or property names (e.g., ABC Elementary School, XYZ Office Building, JKL Restaurant, etc.). In certain examples, parking availability at the destination location (e.g., well-lit garage, low-lit outdoor lot, street parking, meter parking, valet, etc.) also may be retrieved in step 304.

FIGS. 4A and 4B show two examples of driving trip data tables. FIG. 4A includes driving trip data identified (e.g., in step 302) for a set of driving trips by a vehicle 210, including the source and destination location coordinates, and the departure and arrival times. FIG. 4B includes a different set of driving trip data in which additional destination location information has been retrieved (e.g., in step 304), including specific location and/or driving trip purpose data associated with each destination of each driving trip.

In step 305, the driving analysis server 220 may use the destination information retrieved in step 304 to determine risk factors and risk assessment values associated with one or more driving trips by a vehicle 210. The determination of the risk factors and risk assessment values for a driving trip may be performed by the driving analysis server 220 based on the destination location(s) for the driving trip, any information retrieved regarding these locations, and the driving times to and from the destination locations. Additional data relevant to the risk analysis and determinations in step 305 may include traffic data from traffic databases 232, weather data from weather databases 233, and other relevant risk data (e.g., accident data, crime data, vehicle damage data) from other data sources 234.

In certain examples, the driving analysis server 220 may identify and analyze risk factors and risk assessment values for multiple different phases of a driving trip by a vehicle 210. For instance, as shown in the example driving trip table in FIG. 4B, a separate driving trip risk assessment value may be determined for (1) the initial driving trip to a destination, (2) the return driving trip from the destination, and/or (3) parking the vehicle 210 at the destination for the time period between the initial trip and the return trip. For each different phase of a driving trip, risk factors may be identified and evaluated based on the characteristics of the different driving trip phases (e.g., relevant locations and times) and additional data retrieved from various data sources. A risk analysis for a driving trip as a whole may be performed separately, or may be computed by the driving analysis server 220 based on the risk factor and risk assessment determinations for the different phases of the driving trip. Although the example driving trip table in FIG. 4B displays risk assessment values as broad risk categories (i.e., Low Risk, Medium Risk, and High Risk), in other examples, a risk assessment value for a driving trip or a phase of a driving trip may be expressed on a numerical score or value, grade, text description, or other type of value within a predetermined risk scale.

Different risk factors identified by the driving analysis server 220 for a driving trip, or a phase of a driving trip, may include the risks of vehicle accidents, risks of vehicle-related crime (e.g., car theft, property theft, vandalism, etc.), risks of person-related crime (e.g., assault, carjacking, etc.), risks of vehicle ticketing or towing for moving or parking violations, and risks of other vehicle damage (e.g., accidental damage, weather-related damage, damage caused by road conditions, etc.). Certain risk factors may apply more (or exclusively) when the vehicle 210 is driven to or from a destination, while other risks may apply more (or exclusively) when the vehicle 210 is being parked at the destination.

For each risk factor identified by the driving analysis server 220, the available data retrieved from data sources 231-234, and any other available data, may be used to evaluate the risk and calculate a risk assessment value for each phase of the driving trip, or for the entire driving trip. For example, referring again to the table in FIG. 4B, the driving analysis server 220 has evaluated the driving trip risk of the first driving trip (ID 0234) and determined a low risk assessment value for the initial driving trip to ABC Elementary School, and for the return driving trip from the school. These low risk assessment values may be based on separate determinations by the driving analysis server 220 that there is a low likelihood of the vehicle 210 being involved in an accident, vehicle theft or vandalism, or other vehicle damage during the driving trip to and from ABC Elementary School. Risk assessment value determinations for initial or return driving trips may be calculated using the distance and time of the driving trip, the driving conditions along the driving route during the driving trip (e.g., current traffic conditions, weather conditions, road visibility, etc.), and statistics regarding accidents, moving violations, and other moving vehicle damage reports associated with the source, destination, or points along the driving route at the time the vehicle 210 was being driven along that route. For the table shown in FIG. 4B, the driving analysis server 220 also has evaluated the parking risk of first driving trip (ID 0234) and determined a low risk assessment value associated with parking the vehicle 210 at the ABC Elementary School during the driving trip. This parking risk assessment value may be calculated using the parking availability data for the destination location (e.g., garage, outdoor lot, street parking, valet, well-lit parking, unlit parking, etc.), the duration of time that the vehicle 210 will be parked at the destination location, and statistics regarding accidents, vehicle theft or vandalism, parking tickets and towing, and other stationary vehicle damage reports associated with the destination at the time that the vehicle 210 was parked at the destination.

In the table of FIG. 4B, the second row (ID 0235) corresponds to a driving trip by a vehicle 210 to XYZ Office Building. In this example, the driving analysis server 220 has determined a medium driving risk assessment value for the initial morning drive to the office building, and a high driving risk assessment value for the return drive in the evening. In contrast to the driving trip to ABC Elementary School (ID 0234), the higher risk assessment values for the initial driving trip and return driving trip to and from XYZ Office Building may be based on additional driving risks, such as a longer trip distance, increased traffic along the driving route, unfavorable road or weather conditions, and/or based on statistics retrieved from law enforcement databases, insurance databases, or other data sources indicating an increased number of accidents or instances of vehicle damage along the driving route to XYZ Office Building at the times of the initial driving trip and return driving trip.

As another example, the last three rows in the table of FIG. 4B, (IDs 0238, 0239, and 0240) indicate a medium or high parking risk associated with their respective driving trips, in contrast to the low parking risk associated with the first two driving trips in the table (IDs 234 and 235). In this example, the higher parking risk associated with the last three driving trips (IDs 0238, 0239, and 0240) may be based on additional parking risks, such as the parking availability at the destination (e.g., a low lit outdoor lot or street parking, etc.), the duration of time that the vehicle 210 was parked, the parking conditions (e.g., lighting conditions, weather conditions, etc.) at the time the vehicle 210 was parked, and/or statistics retrieved from law enforcement databases, insurance databases, or other data sources indicating an increased number of vehicle thefts, break-ins, vandalism, or other vehicle damage at the destination.

Additionally, certain destinations may have specific driving risks or specific parking risks which may be included in the risk analyses performed by the driving analysis server 220. For example, recreational locations such as baseball fields or golf courses may have additional risks of vehicle damage caused by stray baseballs or golf balls. Outdoor destinations such as camp sites and ski resorts may have additional risks of vehicle damage caused by accidents, inclement weather, or poor road conditions. As another example, certain evening recreational destinations such as bars, casinos, clubs, and concert venues may have additional risks caused by increased numbers of young drivers, reckless drivers, or intoxicated drivers, as well as high instances of vehicle theft and vandalism.

In step 308, the driving trip data may be stored in one or more databases, for example, at the vehicle 210 or in a driving trip and pattern database 223 within the driving analysis server 220. The driving trip data stored in step 308 may include some or all of the vehicle driving data received in step 301, the driving trip and destination data identified in step 302, and/or the driving trip risk factors and risk assessment value data determined in steps 304-305.

Returning to step 303, if the driving trip and destination data identified in step 302 corresponds to a driving trip pattern (303:Yes), then in step 306 the driving analysis server 220 may retrieve a set of previously stored driving trip characteristics, risk factors, and risk assessment values corresponding to the driving trip pattern. For example, once a current driving trip has been identified as corresponding to an existing driving trip pattern, the driving analysis server 220 may retrieve initial driving trip risk data, return driving trip risk data, and parking risk data stored in a driving trip pattern database 223. The driving trip pattern risk data stored in the database 223 may be calculated by the driving analysis server 220 based on an analysis of the previous driving trips matching the same driving trip pattern. For example, the driving analysis server 220 may identify risk factors and perform risk analyses, using similar techniques to those described above in step 305, for a plurality of previous driving trips matching the same driving trip pattern. Thus, in step 306, the driving analysis server 220 may perform no additional risk analysis based on the current driving trip data, but instead may retrieve the previously determined risk data for the corresponding driving trip pattern.

In certain examples, the risk data retrieved for the driving trip pattern in step 306 may be based on a risk analysis, as well as based on empirical data from the previous driving trips matching the pattern, such as accident data, vehicle-related crime data, vehicle damage data, vehicle ticketing or towing, and the like. For example, a set of risk factors for a morning work commute pattern, such as the driving trip length, traffic conditions, neighborhood safety, parking availability, and vehicle accident and damage statistics, may indicate that a morning commute driving trip is a low risk trip for a vehicle 210. However, the driving analysis server 220 may receive empirical data indicating that the morning commute pattern driving trips by the vehicle 210 are higher risk driving trips than predicted by the risk analysis. For instance, if the vehicle 210 has been involved in a higher than expected rate of accidents, incurred vehicle damage, or other driving events or incidents indicative of high risk driving trips, then the driving analysis server 220 may increase the risk determination for the morning commute driving trip pattern by the vehicle 210. As another example, a set of risk factors for a recreational driving trip pattern may indicate that driving trips corresponding to the pattern are high risk trips, however, the empirical data from previous driving trips by the vehicle 210 (e.g., accident data, vehicle damage data, etc.) may indicate that the driving trips corresponding to the pattern by the vehicle 210 are actually lower risk driving trips. Thus, in certain examples, vehicle driving data may be stored corresponding to accidents, vehicle damage, and other risk indicators associated with driving trips and driving trip patterns. In such examples, the risk analyses of driving trips may be based on the empirical data stored from previous trips matching the same driving trip pattern.

In step 307, the driving analysis server 220 may identify one or more driving behavior variations between the current driving trip data received in step 301 and the corresponding driving trip pattern data retrieved in step 306, and may adjust or recalculate the current driving trip risk data as a result of the driving behavior variations. For example, if a driver leaves later than usual for work in the morning, he or she may drive faster or may commit one or more moving violations in order to make it to work on time. In this case, the driving analysis server 220 may identify this driving behavior variation by comparing the departure time of the current driving trip to the average departure time for the driving pattern. The driving analysis server 220 also may compare the driving speeds, trip arrival time, and driving safety rating of the current trip to the averages for the driving trip pattern. Based on these comparisons, the driving analysis server 220 may determine that the late departure was the cause for the speeding and higher risk driving behaviors, and may increase the risk assessment values for the current driving trip based on this analysis.

The driving analysis server 220 may determine other types of driving variations and driving events occurring in a driving trip, by comparing the current driving trip data to previously stored data for driving trips within the same pattern. For instance, the driving analysis server 220 may identify instances of driving variations when a driver leaves later than usual from work and avoids heavy traffic conditions or inclement weather, and may lower the risk assessment values of the current driving trip based on the variation. As another example, a driver may drive faster or slower, or may take a different driving route than normal for a driving trip pattern, and the risk assessment values of the current driving trip may be increased or decreased as a result of these driving trip variations.

In step 308, as discussed above, the driving trip data for the current driving trip may be stored in one or more databases, for example, at the vehicle 210 or in a driving trip database 223. The driving trip data stored in step 308 may include some or all of the vehicle driving data received in step 301, the risk factors and risk assessment values retrieved in step 306 for the driving trip pattern, and data corresponding to any driving behavior variations and risk assessment changes determined in step 307.

Referring now to FIG. 5, a flow diagram is shown illustrating an example method of calculating or updating a driver score based on an analysis of driving trip data. In step 501, driving trip data is retrieved for one or more driving trips associated with a vehicle 210 and/or a driver of the vehicle 210. For example, the driving analysis server 220 may retrieve a plurality of driving trip records for a vehicle 210 or driver from driving trip or driving pattern database 223 stored at the vehicle 210 or elsewhere.

In step 502, the driving analysis server 220 may calculate vehicle usage statistics and/or may perform a risk analysis for the vehicle 210 or driver based on the data retrieved in step 501. For example, referring to the example driving trip data table in FIG. 4B, a driving analysis server 220 may analyze each driving trip in order to classify the vehicle usage type or driving purposes of the vehicle 210. For instance, the driving analysis server 220 may aggregate the trip type or purpose data based on the number of driving trips, the amounts of driving time, or the total mileage associated with different driving trip types/purposes. As an example, the driving trip data for a vehicle 210 may be analyzed to determine that the vehicle 210 is driven 25% for work trips, 25% for local nearby shopping and errand trips, 10% for local parks and recreational trips, 30% for urban restaurant and bar trips, and 10% for rural outdoor recreational trips.

The driving analysis server 220 also may perform risk assessment aggregations and analyses in step 502. For example, referring to the driving trip data table in FIG. 4B, the risk assessment values in the "Trip Risk," "Return Risk," and "Parking Risk" columns for each driving trip may be aggregated and/or averaged to calculate one or more overall risk assessment values for the vehicle 210 or a driver of the vehicle 210, based on the driving trip data. As an example, the driving trip data for a vehicle 210 may be analyzed to determine that the vehicle 210 is being driven 30% of the time on low risk driving trips, 50% of the time on medium risk driving trips, and 20% of the time on high risk driving trips. Similar analyses may be performed to determine aggregate parking risks and average overall risks for a vehicle 210 based on the driving trip data.

In step 503, the driving analysis server 220 may calculate or update a driver score for the vehicle 210, or a driver of the vehicle 210, based on the vehicle usage determinations and risk analyses performed in step 502. As discussed above, driver scores may be generated and used by insurance companies, financial instructions, and other organizations. For example, an insurance company server may periodically calculate and update driver scores for the insurance company's customers, and may use the driver scores to perform insurance analyses and determinations (e.g., determine coverage, calculate premiums and deductibles, award safe driver discounts, etc.). In step 503, the driving analysis server 220 may perform one or more driver score calculations using the vehicle usage data and risk analyses performed in step 502. For example, a vehicle 210 or a driver that drives for primarily recreational purposes to higher risk destinations may be given a lower driver score than a comparable vehicle 210 or driver that drives for primarily for work or school purposes to lower risk destinations. Driver score calculations may be based on the aggregated or average type or purpose data and/or the risk assessment data for the driving trip data analyzed in step 502. As discussed above, driver scores also may be based on a driver's age, vision, medical history, driving record, and/or other account data relating to the driver. In certain examples, preliminary driver scores may be generated for vehicles 210 or drivers based on driver demographics and account data, and then be adjusted or updated based on periodic analyses of driving trips associated with the vehicle 210 or driver.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A driving analysis server comprising:
a processing unit comprising a processor; and
a memory unit storing computer-executable instructions, which when executed by the processing unit, cause the driving analysis server to:
  receive, in real-time, vehicle data from a plurality of sensors arranged on a first vehicle, the vehicle data corresponding to at least a first driving trip by the first vehicle;
  perform, in real-time, an analysis of the received vehicle data and determine one or more risk assessment values corresponding to the first driving trip, determining the one or more risk assessment values including:
    determining whether the received vehicle data associated with the first driving trip corresponds to a driving pattern of a plurality of stored driving patterns associated with the first vehicle, determining whether the received vehicle data corresponds to the driving pattern including:
      comparing the received vehicle data to data from a plurality of previous driving trips of the first vehicle;

determining whether the received vehicle data for the first driving trip corresponds to a previous driving trip, of the plurality of previous driving trips, having at least a threshold frequency;

responsive to determining that the vehicle data for the first driving trip does not correspond to the previous driving trip having at least the threshold frequency, determining that the received vehicle data for the first driving trip does not correspond to the driving pattern; and responsive to determining that the received vehicle data for the first driving trip does correspond to the previous driving trip having at least the threshold frequency, determining that the received vehicle data corresponds to the driving pattern;

responsive to determining that the received vehicle data does not correspond to the driving pattern, retrieve information associated with a destination of the first driving trip from a location database;

responsive to determining that the received vehicle data associated with the first driving trip corresponds to the driving pattern of the stored plurality of driving patterns, retrieve a set of previously stored driving trip characteristics, risk factors, and risk assessment values corresponding to the driving pattern; and calculate a driver score for the first vehicle or a first driver of the first vehicle, based on at least one of: the retrieved risk assessment values corresponding to the driving pattern corresponding to the first driving trip and the retrieved information associated with the destination of the first driving trip.

2. The driving analysis server of claim 1, wherein the retrieved risk assessment values are based on at least one previous driving trip, of the plurality of previous driving trips, different from the first driving trip.

3. The driving analysis server of claim 2, wherein the driver score is calculated based on the retrieved risk assessment values of the at least one previous driving trip different from the first driving trip.

4. The driving analysis server of claim 1, wherein determining whether the received vehicle data associated with the first driving trip corresponds to the driving pattern of the plurality of stored driving patterns further includes:

identifying a source location of the first driving trip, the destination of the first driving trip, and a time of the first driving trip; and determining whether at least one of the source location of the first driving trip and the destination of the first driving trip are within a predefined location threshold of a source location and a destination of the driving pattern corresponding to the first driving trip.

5. The driving analysis server of claim 1, wherein determining whether the received vehicle data associated with the first driving trip corresponds to the driving pattern of the plurality of stored driving patterns further includes:

identifying a source location of the first driving trip, the destination of the first driving trip, and a time of the first driving trip; and determining whether the time of the first driving trip is within a predefined time threshold of time of the driving pattern corresponding to the first driving trip.

6. The driving analysis server of claim 1, wherein calculating the driver score for the first vehicle or the first driver of the first vehicle, based on the retrieved risk assessment values corresponding to the driving pattern corresponding to the first driving trip further includes:

receiving current weather data or current traffic data associated with a route of the driving pattern;

calculating a risk assessment value associated with the current weather data or the current traffic data; and calculating the driver score based on the retrieved risk assessment values corresponding to the driving pattern corresponding to the first driving trip and the calculated risk assessment value for the current weather data or the current traffic data.

7. The driving analysis server of claim 1, wherein calculating the driver score for the first vehicle or the first driver of the first vehicle, based on the retrieved risk assessment values corresponding to the driving pattern corresponding to the first driving trip further includes:

using the vehicle data corresponding to the first driving trip, determining a first parking time corresponding to the first vehicle being parked at the destination of the first driving trip;

calculating a risk assessment value associated with parking the first vehicle at the destination at the first parking time; and calculating the driver score based on the retrieved risk assessment values corresponding to the driving pattern corresponding to the first driving trip and the calculated risk assessment value for the first vehicle being parked at the destination of the first driving trip.

8. The driving analysis server of claim 1, further including instructions that, when executed, cause the driving analysis server to:

responsive to determining that the received vehicle data associated with the first driving trip corresponds to the driving pattern of the stored plurality of driving patterns and after calculating the driver score for the first vehicle or the first driver of the first vehicle, receive additional current driving trip data;

identify, based on the received additional current driving trip data, one or more driving behavior variations between the additional current driving trip data and the corresponding driving pattern; and adjust the calculated driver score for the first vehicle or the first driver of the first vehicle based on the one or more driving behavior variations.

9. A driving analysis server comprising:

a processing unit comprising a processor; and a memory unit storing computer-executable instructions, which when executed by the processing unit, cause the driving analysis server to:

receive, in real-time, vehicle data from a plurality of sensors arranged on a first vehicle, the vehicle data corresponding to at least a first driving trip by the first vehicle;

perform, in real-time, an analysis of the received vehicle data and determine one or more risk assessment values corresponding to the first driving trip, determining the one or more risk assessment values including:

determining a source location of the first driving trip;

determining a destination of the first driving trip, the destination being the destination to which the first vehicle travelled from the determined source location;

determining whether the source location and the destination correspond to a driving pattern of a plurality of driving patterns associated with the first vehicle, determining whether the source location and the destination correspond to the driving pattern including:

comparing the source location and the destination to data from a plurality of previous driving trips;
determining whether the source location and the destination correspond to data from a previous driving trip, of the plurality of previous driving trips, of the first vehicle having at least a threshold frequency;
responsive to determining that the source location and the destination do not correspond to the data from the previous driving trip having at least the threshold frequency, determining that the source location and the destination do not correspond to the driving pattern;
responsive to determining that the source location and the destination correspond to the data from the previous driving trip of the first vehicle having at least the threshold frequency, determining that the source location and the destination correspond to the driving pattern;
responsive to determining that the source location and the destination do not correspond to the driving pattern, retrieve information associated with the destination of the first driving trip from a location database;
responsive to determining that the source location and the destination correspond to the driving pattern of the plurality of driving patterns, retrieving a set of previously stored driving trip characteristics, risk factors, and risk assessment values corresponding to the driving pattern; and
calculate a driver score for the first vehicle or a first driver of the first vehicle, based on at least one of: the retrieved risk assessment values corresponding to the driving pattern corresponding to the first driving trip and the retrieved information associated with the destination of the first driving trip.

10. The driving analysis server of claim 9, wherein the retrieved risk assessment values are based on at least one previous driving trip, of the plurality of previous driving trips, different from the first driving trip.

11. The driving analysis server of claim 10, wherein the driver score is calculated based on the retrieved risk assessment values of the at least one previous driving trip different from the first driving trip.

12. The driving analysis server of claim 9, wherein determining whether the source location of the first driving trip and the destination of the first driving trip correspond to the driving pattern of the plurality of driving patterns further includes:
determining whether at least one of the source location of the first driving trip and the destination of the first driving trip are within a predefined location threshold of a source location and destination of the driving pattern corresponding to the first driving trip.

13. The driving analysis server of claim 9, wherein determining whether the source location of the first driving trip and the destination of the first driving trip correspond to the driving pattern of the plurality of driving patterns further includes:
receiving time data for the first driving trip, the time data being received in the received vehicle data; and
determining whether the time data for the first driving trip is within a predefined time threshold of time of the driving pattern corresponding to the first driving trip.

14. The driving analysis server of claim 9, wherein calculating the driver score for the first vehicle or the first driver of the first vehicle, based on the retrieved risk assessment values corresponding to the driving pattern corresponding to the first driving trip further includes:
receiving current weather data or current traffic data associated with a route of the driving pattern;
calculating a risk assessment value associated with the current weather data or the current traffic data; and
calculating the driver score based on the retrieved risk assessment values corresponding to the driving pattern corresponding to the first driving trip and the calculated risk assessment value for the current weather data or the current traffic data.

15. The driving analysis server of claim 9, wherein calculating the driver score for the first vehicle or the first driver of the first vehicle, based on the retrieved risk assessment values corresponding to the driving pattern corresponding to the first driving trip further includes:
using the vehicle data corresponding to the first driving trip, determining a first parking time corresponding to the first vehicle being parked at the destination of the first driving trip;
calculating a risk assessment value associated with parking the first vehicle at the destination at the first parking time; and
calculating the driver score based on the retrieved risk assessment values corresponding to the driving pattern corresponding to the first driving trip and the calculated risk assessment value for the first vehicle being parked at the destination of the first driving trip.

16. A driving analysis system comprising a first vehicle on-board data recording system and a driving analysis server:
wherein the first vehicle on-board data recording system comprises:
one or more vehicle operation sensors configured to record vehicle operation data at a first vehicle;
one or more global positioning system (GPS) devices configured to record location data at the first vehicle; and
one or more telematics devices configured to transmit the vehicle operation data and the location data from the first vehicle to the driving analysis server,
wherein the driving analysis server comprises a processor and a memory unit storing computer-executable instructions, which when executed by the processor, cause the driving analysis server to:
receive, in real-time, the vehicle operation data from the one or more vehicle operation sensors;
receive, in real-time, the location data from the one or more GPS devices;
perform in real-time, an analysis of the received data from the one or more vehicle operation sensors and the one or more GPS devices;
determine, based at least in part on the analysis, a source location of a first driving trip;
determine a destination of the first driving trip, the destination being the destination to which the first vehicle travelled from the determined source location;
determine whether the source location and the destination correspond to a driving pattern of a plurality of driving patterns associated with the first vehicle, determining whether the source location and the destination correspond to the driving pattern including:
comparing the source location and the destination to data from a plurality of previous driving trips;

determining whether the source location and the destination correspond to data from a previous driving trip, of the plurality of previous driving trips, of the first vehicle having at least a threshold frequency;

responsive to determining that the source location and the destination do not correspond to the data from the previous driving trip having at least the threshold frequency, determining that the source location and the destination do not correspond to the driving pattern;

responsive to determining that the source location and the destination correspond to the data from the previous driving trip of the first vehicle having at least the threshold frequency, determining that the source location and the destination correspond to the driving pattern;

responsive to determining that the source location and the destination do not correspond to the driving pattern, retrieve information associated with the destination of the first driving trip from a location database;

responsive to determining that the source location and the destination correspond to the driving pattern of the plurality of driving patterns, retrieve a set of previously stored driving trip characteristics, risk factors, and risk assessment values corresponding to the driving pattern; and calculate a driver score for the first vehicle or a first driver of the first vehicle, based on at least one of: the retrieved risk assessment values corresponding to the driving pattern corresponding to the first driving trip and the retrieved information associated with the destination of the first driving trip.

17. The driving analysis system of claim 16, wherein the retrieved risk assessment values are based on at least one previous driving trip, of the plurality of previous driving trips, different from the first driving trip and wherein the driver score is calculated based on the retrieved risk assessment values of the at least one previous driving trip different from the first driving trip.

18. The driving analysis system of claim 16, wherein determining whether the source location of the first driving trip and the destination of the first driving trip correspond to the driving pattern of the plurality of driving patterns further includes:

receiving time data for the first driving trip, the time data being received in the received vehicle operation data; and determining whether the time data for the first driving trip is within a predefined time threshold of time of the driving pattern corresponding to the first driving trip.

19. The driving analysis system of claim 16, wherein calculating the driver score for the first vehicle or the first driver of the first vehicle, based on the retrieved risk assessment values corresponding to the driving pattern corresponding to the first driving trip further includes:

receiving current weather data or current traffic data associated with a route of the driving pattern;

calculating a risk assessment value associated with the current weather data or the current traffic data; and calculating the driver score based on the retrieved risk assessment values corresponding to the driving pattern corresponding to the first driving trip and the calculated risk assessment value for the current weather data or the current traffic data.

20. The driving analysis system of claim 16, wherein calculating the driver score for the first vehicle or the first driver of the first vehicle, based on the retrieved risk assessment values corresponding to the driving pattern corresponding to the first driving trip further includes:

using the vehicle operation data and the location data corresponding to the first driving trip, determining a first parking time corresponding to the first vehicle being parked at the destination of the first driving trip;

calculating a risk assessment value associated with parking the first vehicle at the destination at the first parking time; and calculating the driver score based on the retrieved risk assessment values corresponding to the driving pattern corresponding to the first driving trip and the calculated risk assessment value for the first vehicle being parked at the destination of the first driving trip.

* * * * *